United States Patent [19]

Shimada et al.

[11] Patent Number: 4,729,617
[45] Date of Patent: Mar. 8, 1988

[54] SCANNING CLOCK GENERATING DEVICE FOR OPTICAL SCANNER

[75] Inventors: Kazuyuki Shimada; Isamu Shibata, both of Tokyo; Susumu Imakawa, Yokohama, all of Japan

[73] Assignee: Ricoh Company, Ltd., Tokyo, Japan

[21] Appl. No.: 855,703

[22] Filed: Apr. 25, 1986

[30] Foreign Application Priority Data

Apr. 30, 1985 [JP] Japan .................. 60-92960

[51] Int. Cl.⁴ .............................. G02B 26/10
[52] U.S. Cl. ......................... 350/6.8; 350/6.5; 358/208
[58] Field of Search ............... 350/6.1–6.91; 250/234–236; 356/385, 386, 448; 358/206, 208

[56] References Cited

U.S. PATENT DOCUMENTS

| | | | |
|---|---|---|---|
| 3,899,663 | 8/1975 | Pirlet | 356/386 |
| 4,541,061 | 9/1985 | Schoon | 358/208 |
| 4,571,623 | 2/1986 | Schoon | 358/208 |
| 4,643,517 | 2/1987 | Ruger et al. | 350/6.6 |

*Primary Examiner*—John K. Corbin
*Assistant Examiner*—Loha Ben
*Attorney, Agent, or Firm*—Oblon, Fisher, Spivak, McClelland & Maier

[57] ABSTRACT

A scanning clock generating device for an optical scanner which scans a selected surface by a light beam to write optical information or read image information. The scanner scans the surface by a light beam which is deflected at a constant or a non-constant angular velocity and without resorting to an F-theta lens. The scanning clock generating device generates a scanning clock the frequency of which is continuously variable responsive to changes of scanning velocity on the surface to be scanned.

2 Claims, 4 Drawing Figures

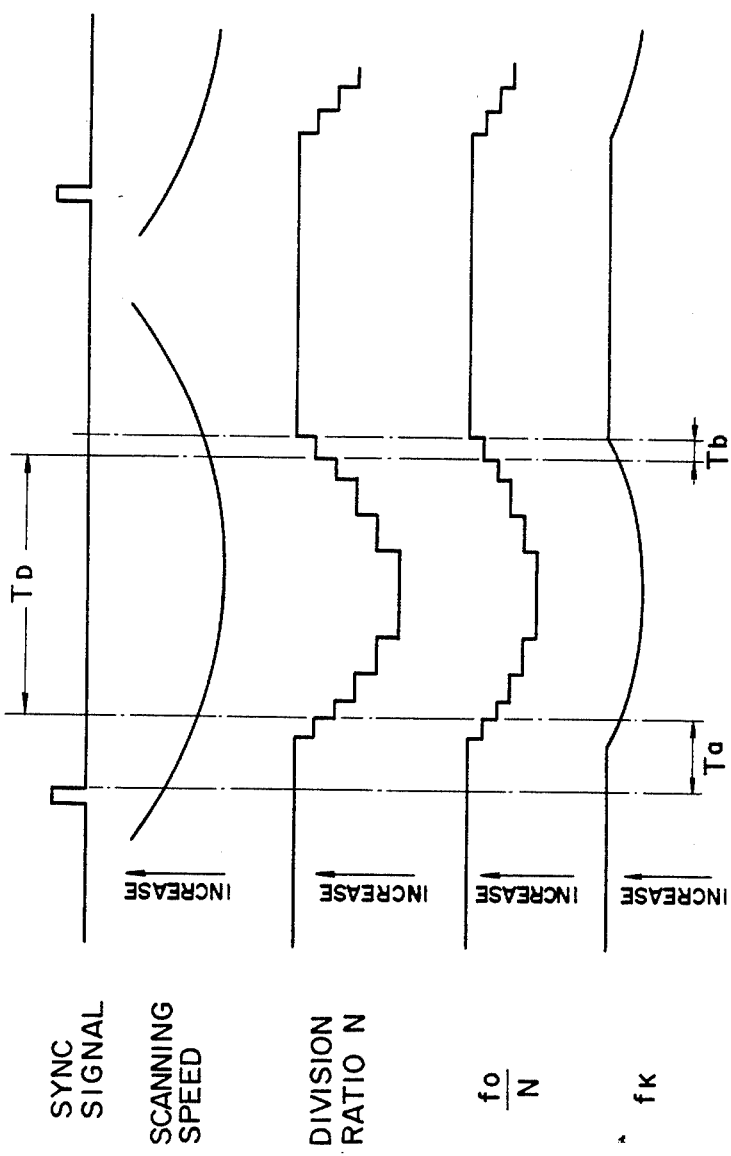

SCANNING CLOCK GENERATING DEVICE FOR OPTICAL SCANNER

BACKGROUND OF THE INVENTION

The present invention relates to a scanning clock generating device for an optical scanner.

As well known in the art, an optical scanner is adapted to scan a desired surface by a light beam to write optical information or read out image information. In this type of scanner, a light beam is usually deflected at a constant angular velocity by a polygon mirror, a holoscanner or like rotary optical deflector. The scanning velocity on the selected surface is maintained constant typically by an F-theta lens. However, because an F-theta lens is expensive due to its specially designed characteristics, eliminating the need for such a lens would be desirable. Meanwhile, a polygon mirror which causes a light beam to scan at various angular velocities has recently been proposed (Japanese Patent Application No. 59-274324). An F-theta lens cannot be used with the variable angular velocity type polygon mirror because it would fail to maintain the scanning velocity constant.

An optical scanner uses a scanning clock in order to turn on and off a light beam during the course of scanning. Assuming that a period of time assigned to reading or writing on one pixel of information is T, the frequency $f_k$ of the scanning clock is represented by $1/T$. Where an F-theta lens is not used and, therefore, the scanning velocity on a surface to be scanned is not constant, holding the frequency $f_k$ of the scanning clock unchanged would introduce distortions into the information writing and reading operations.

It follows that if the clock frequency $f_k$ were variable pixel by pixel, optical scanning free from distortions could be realized without resorting to an F-theta lens. However, varying the clock frequency $f_k$ on a pixel basis is not always easy. In light of this, there has been proposed a method which divides a predetermined scanning range into a plurality of blocks and discontinuously varies the clock frequency block by block, while assigning a particular frequency to each of the blocks (Japanese Unexamined Patent Publication No. 58-87965). The problem with such a method is that because the frequency is discontinuously varied from one block to another, in the case of writing optical information, for example, the discontinuous frequencies are reflected by a kind of discontinuity in recorded images.

SUMMARY OF THE INVENTION

It is therefore an object of the present invention to provide a scanning clock generating device which is usable with an optical scanner of the type scanning a desired surface by a light beam deflected at a constant or a non-constant angular velocity and without using an F-theta lens, and is capable of generating a scanning clock whose frequency is continuously variable responsive to changes in the scanning velocity on the selected surface.

It is another object of the present invention to provide a generally improved clock generating device for an optical scanner.

In an optical scanner of the type scanning a desired surface by a deflected light beam and without using an F-theta lens, a scanning clock generating device for generating an image scanning clock the frequency of which is continuously variable of the present invention comprises an oscillator for oscillating a reference clock, a first frequency divider for dividing a frequency of the reference clock to produce a position control clock, an up-down counter for stepwisely varying a division ratio which is assigned to the first frequency divider, a controller for, in the event of scanning a scanning range which is divided into K blocks $BL_i$ ($i=1$ to K), driving based on a predetermined finite series $M_i$ ($i=1, 2, \ldots, K$) the up-down counter responsive to every $M_i$ pulses of the position control clock in an "i" block $BL_i$ ($i=1$ to K), thereby stepwisely switching over the division ratio N, and a phase locked loop for generating a scanning clock a frequency of which continuously varies responsive to the stepwise variation of the frequency of the position control clock.

In a preferred embodiment, the phase locked loop comprises a phase detector, a low-pass filter, a voltage-controlled oscillator, and a second frequency divider having a division ratio M.

A scanning clock generating device for an optical scanner which scans a selected surface by a light beam to write optical information or read image information. The scanner scans the surface by a light beam which is deflected at a constant or a non-constant angular velocity and without resorting to an F-theta lens. The scanning clock generating device generates a scanning clock the frequency of which is continuously variable responsive to changes of scanning velocity on the surface to be scanned.

The above and other objects, features and advantages of the present invention will become more apparent from the following detailed description taken with the accompanying drawings.

BRIEF DESCRIPTION OF THE DRAWINGS

FIG. 4 shows waveforms of signals which appear in various portions of the device as shown in FIG. 2.

DESCRIPTION OF THE PREFERRED EMBODIMENT

While the scanning clock generating device of the present invention is susceptible of numerous physical embodiments, depending upon the environment and requirements of use, a substantial number of the herein shown and described embodiment have been made, tested and used, and all have performed in an eminently satisfactory manner.

To facilitate an understanding of the present invention, an implementation for optical scanning which varies the frequency $f_k$ of a scanning clock pixel by pixel and does not use an F-theta lens will be described.

As previously stated, a scanning clock serves as a clock signal for turning on and off a light beam during the course of scanning. Assuming that a period of time assigned to reading or writing of one pixel of information is T, the frequency $f_k$ of the scanning clock is represented by $1/T$. Where an F-theta lens is not used and, therefore, the scanning velocity on a surface to be scanned is not constant, holding the frequency $f_k$ of the scanning clock unchanged would introduce distortions in the information writing and reading operations.

Figure 1:
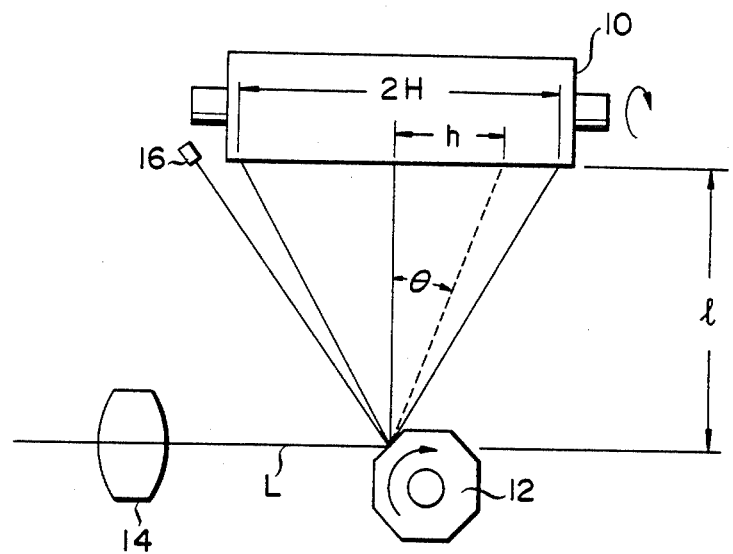
FIG. 1 is a schematic diagram representative of optical scanning which is performed by varying the frequency of a scanning clock and without using an F-theta lens.

Referring to FIG. 1, there are shown a body 10 to be scanned, a polygon mirror 12 for deflecting a light beam L at a constant angular velocity, and a condensing lens 14. In the illustrative arrangement, the body 10 is represented by a photoconductive element by way of example. The light beam L usually comprises a laser beam issuing from a gas laser or a semiconductor laser. Where distances l and h are selected as shown in FIG. 1, then $$h = l \cdot \tan \theta$$

Assuming that the angular velocity of the polygon mirror 12 is $\omega_o$ (constant), because the angular velocity of the light beam $d\theta/dt = 2\omega_o = \omega$ (constant), the scanning velocity $dh/dt$ is expressed as:

$$\frac{dh}{dt} = l\omega \cdot \frac{1}{\cos^2 \theta} = l \cdot \omega \cdot \left(1 + \frac{h^2}{l^2}\right)$$

Then, assuming that the scanning range wavelength is 2H, and $H + h = h'$, $$\frac{dh'}{dt} = l\omega \left(1 + \frac{(h' - H)^2}{l^2}\right)$$

Assume that the scanning range wavelength 2H covers $2n_o$ pixels in total. In this condition, the scanning velocity Vn at the "n" pixel as counted from the left-hand end, or beginning end, of the scanning range is produced by $$Vn = l\omega \left(1 + \frac{(nd - n_o d)^2}{l^2}\right)$$

where d is the width of one pixel. Because the frequency $f_k$ of the scanning clock as derived from its definition is Vn/d, $$f_K(n) = \frac{l\omega}{d} \left(1 + \frac{(nd - n_o d)^2}{l^2}\right) \quad \text{Eq. (1)}$$

It will thus be seen that if the clock frequency $f_k$ were varied pixel by pixel according to the Eq. (1), optical scanning could be implemented without the need for an F-theta lens and without introducing any distortion in reading and writing of information.

However, as already discussed, varying the clock frequency pixel by pixel is not easy.

The present invention will be described hereinafter in detail.

Figure 2:
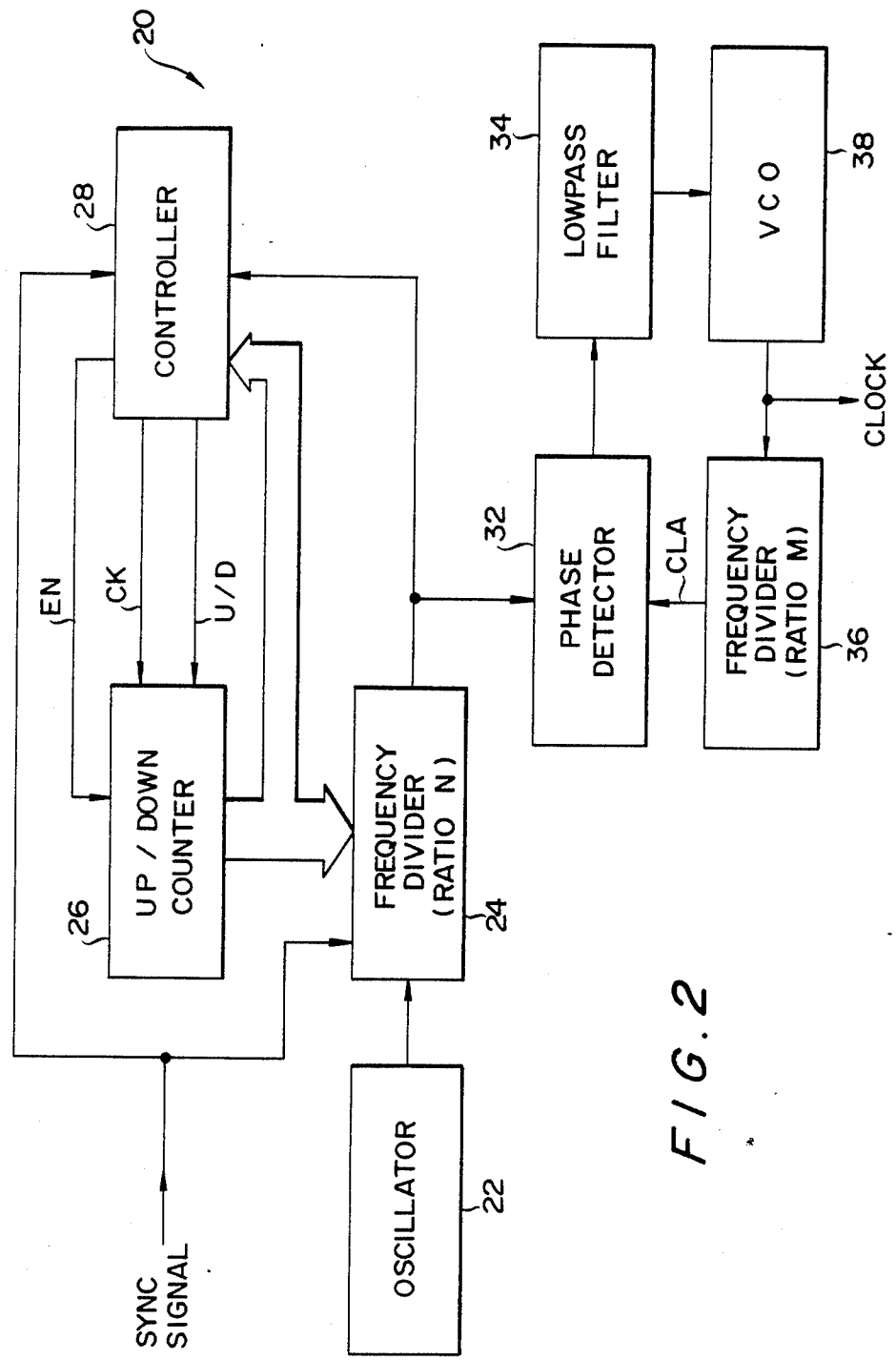
FIG. 2 is a block diagram of a clock generating device embodying the present invention.

Referring to FIG. 2, a clock generating device embodying the present invention is shown and generally designated by the reference numeral 20. The device 20 comprises an oscillator 22, a first frequency divider 24, an up-down counter 26, a controller 28, and a phase-locked loop (PLL) 30. The oscillator 22 generates a reference clock the frequency of which is assumed to be $f_o$. The first frequency divider 24 divides the reference clock to produce a position control clock. The up-down counter 26 functions to switch over the division ratio N of the frequency divider 24. Here, each of the frequency $f_o$ and the division ratio N mentioned above is naturally a constant.

The controller 28 plays the following role. The scanning range is divided into K blocks BLi (i=1 to K). Based on a predetermined finite series Mi (i=1 to K), in the "i" block BLi the controller 28 drives the up-down counter 26 responsive to every Mi pulses of the position control clock thereby stepwisely switching over the division ratio N over the entire scanning range. Specifically, assuming that the initial value of the division ratio N is $N_o$, then the frequency of the position control clock is $f_o/N_o$ at first. In the first block BLi, as the controller 28 counts M1 pulses of the position control clock, it switches the division ratio of the frequency divider 24 from $N_o$ to $N_1$ (=$N_o + \Delta N$) via the up-down counter 26. As a result, the frequency of the position control clock becomes $f_o/N_1$. When the controller 28 has counted M1 pulses of the clock now having such a new frequency, it switches the ratio $N_1$ to another ratio $N_2$. This procedure is repeated n1 times. Next, in the second block BL2, the controller 28 repeats n2 times the operation of switching the division ratio responsive to every M2 pulses of the position control clock. This process is performed on each of the blocks. In the "i" block BLi, the switchover of the division ratio occurs ni times in total for each Mi pulses of the position control clock.

The PLL 30 is made up of a phase detector 32, a low-pass filter 34, a second frequency divider 36, and a voltage-controlled ocillator (VCO) 38. The frequency divider 36 has a fixed division ratio M. With this construction, the PLL 30 serves to generate a scanning clock the frequency of which is continuously variable responsive to the stepwise variation of the frequency of the position control clock.

In operation, the reference clock frequency $f_o$ oscillated by the oscillator 22 is divided by the first frequency divider 24 to become the position control clock. The position control clock is applied to the controller 28 and the phase detector 32 of the PLL 30. The phase detector 32 compares the phase of the position control clock with that of a clock CLA, which is applied thereto from the second frequency divider 36. The output of the phase detector 32 which is a pulse signal representative of the phase difference is fed to the low-pass filter 34. Supplied with the phase difference information via the low-pass filter 34, the VCO 38 generates a clock whose frequency corresponds to the output voltage of the low-pass filter 34. This clock is fed out to serve as a scanning clock. At the same time, the scanning clock is divided by the frequency divider 36 and then applied to the phase detector 32 to be compared with the position control clock as previously stated.

In the PLL 30, the frequency of the clock outputted by the VCO 38 remains unchanged insofar as the phase difference between the clock CLA and the position control clock as compared by the phase detector 32 is not changed. This particular condition will hereinafter be referred to as a PLL equilibrium condition. For example, assuming that in the PLL equilibrium condition the frequency of the position control clock if $f_o/N$, the frequency of the clock CLA is also $f_o/N$ so that the clock generated by the VCO 38 under the above condition has a frequency $f_k$ which is expressed as:

$$f_k = f_o \cdot \frac{1}{N} \cdot M = f_o \cdot \frac{M}{N}$$

When the division ratio of the frequency divider 24 is changed from N to N', the frequency of the position control clock becomes $f_o \cdot 1/N'$ resulting in a phase difference between the position control clock and the clock CLA. While this causes the output clock frequency $f_k$ of the VCO 38 to vary accordingly, the variation of the frequency $f_k$ occurs continuously, that is, it varies from $f_o \cdot M/N$ to $f_o \cdot M/N'$ continuously and monotonously. In this manner, by stepwisely changing the division ratio N of the frequency divider 24, it is possible to continuously change the frequency $f_k$ of the scanning clock.

The controller 28 generates a clock CK for causing the up-down counter 26 to produce a preset value representative of a division ratio of the frequency divider 24, a signal EN for enabling the up-down counter 26, and a signal U/D for selecting an up-count or a down-count mode. The signal U/D is generated such that the mode is switched from the up-count mode (or down-count mode) to the down-count mode (or up-count mode) in the vicinity of an extreme value of the scanning velocity. Upon entry of the clock CL, the counter 26 alters the preset value to switch over the division ratio of the frequency divider 24.

As previously stated, the generation of the clock CK is performed block by block, BLi (i=1 to K), and based on a finite series Mi (i=1 to K). Specifically, Mi and ni are each predetermined block by block; in the "i" block BLi, the controller 28 generates the clock CK every time Mi pulses of the position control clock are applied thereto, the clock CK being generated ni consecutive times in the block BLi.

The number of blocks K and the values of Mi and ni are selected such that the frequency $f_k$ of the scanning clock that is generated by the VCO 38 well approximates itself to frequency changes due to changes of scanning velocity, e.g. Eq. (1). Such may be accomplished either experimentally or theoretically in conformity to particular design conditions.

Figure 3:
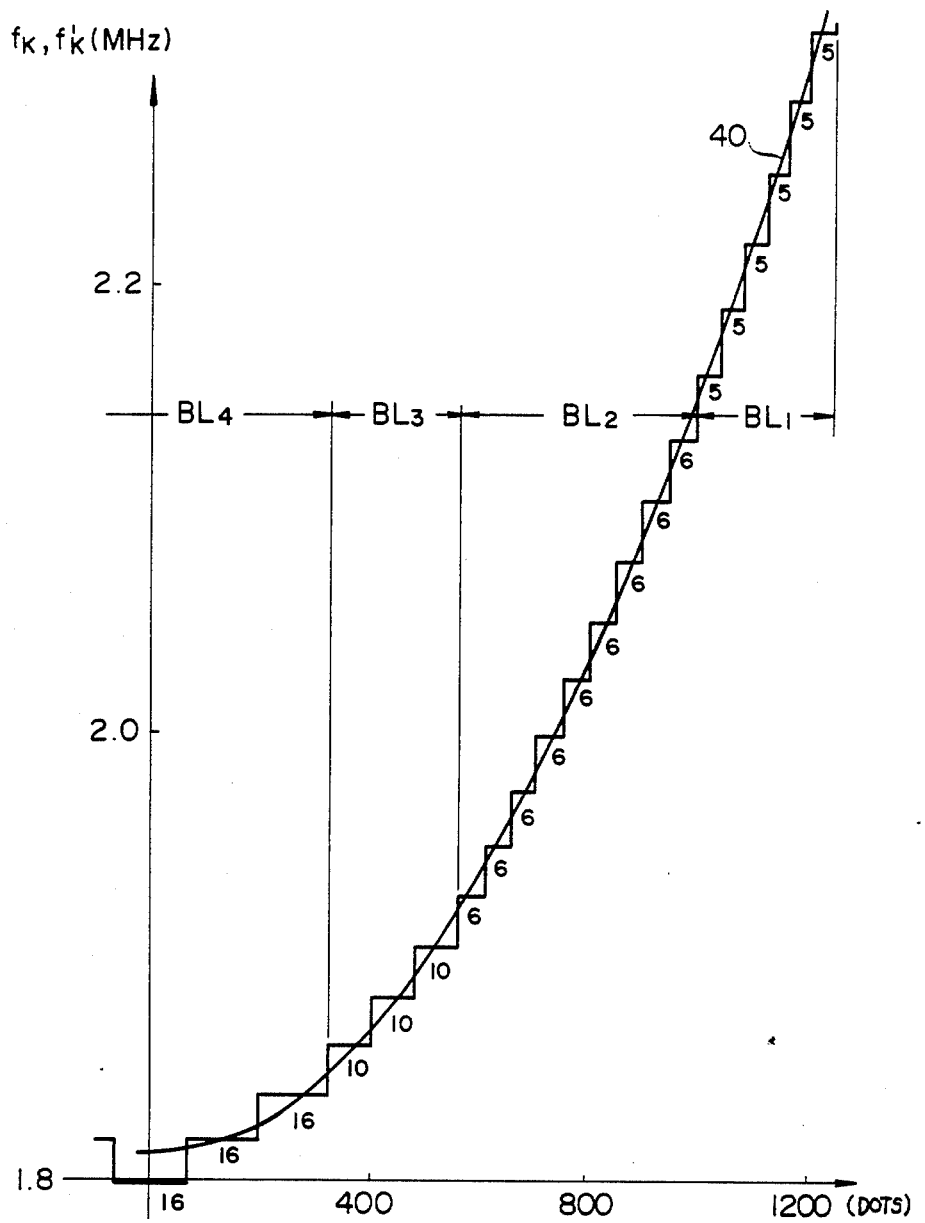
FIG. 3 is a plot useful for describing the present invention.

Referring to FIG. 3, there is plotted an exemplary stepwise variation of a clock frequency f'$_k$ which is caused by an ideal variation of the scanning clock frequency $f_k$ (curve 40) and switchover of the division ratio. The numerals 5, 6, 10 and 16 provided below the frequency variation correspond respectively to M1, M2, M3 and M4 with the right-hand end of the plot assumed to be the scan start side. As shown, n1 is 6, n2 is 9, n3 is 3, and n4 is 5. The plot shows only the right-hand half of a symmetrical graph; M5 is 10, n5 is 3, M6 is 9, M7 is 5, and n7 is 6. As shown, the blocks BLi are the regions which approximate themselves to the continuous curve of frequency $f_k$ by straight lines. In each of the blocks, the respective steps share the same lateral width. The clock frequency fk is M times greater than the position control clock. Although the clock frequency f'k per se is varied stepwisely, the actual scanning clock frequency is allowed to vary continuously by the PLL 30 well approximating itself to the curve 40.

Referring to FIG. 4, a timing chart is shown which demonstrates the operation of the device of FIG. 2. Specifically, FIG. 4 shows a synchronizing signal, a scanning velocity, a division ratio N, a frequency $f_o/N$ of position control clock, and a frequency $f_k$ of scanning clock. Since the up-down mode of the counter 26 is switched over in the vicinity of the extreme value of the scanning velocity, the division ratio N and the frequencies $f_o/N$ and $f_k$ are each symmetrical with respect to a point which is adjacent to the extreme value.

The synchronizing signal is an output signal of a photosensor which is designated by the reference numeral 16 in FIG. 1. This synchronizing signal is adapted to initialize the first frequency divider 24 and is also routed to the controller 28. The signal EN from the controller 28 enables the counter 26 upon the lapse of a predetermined period of time Ta after the delivery of the synchronizing signal, while disenabling the counter 26 upon the lapse of a period of time Tb after a scanning period of time Td. As soon as the counter 26 is disenabled, the division ratio N is restored to and fixed at the initial value.

As a practical example, there will be described a case wherein use is made of a special polygon mirror the deflection angle $2\theta$ thereof for a rotation angle $\alpha$ is $$\sin \theta = \left(1 - \frac{A}{R} \sin \theta \right)$$

where A and R are constants associated with the configuration of the polygon (as proposed in Japanese Patent Application No. 59-274324). In this case, the frequency $f_k(n)$ of the scanning clock varies as represented by the curve 40 in FIG. 2. Test results showed that where the division ratio M of the second divider 26 is 8, the frequency $f_o$ of the reference clock is 20 MHz, the switch-over width of the division ratio N is 1, the number of pixels $2n_o$ in the scanning range is 2,400, the number of elements of the finite series is 7, M1=5, M2=6, M3=10, M4=16, M5=10, M6=6, M7=5, n1=6, n2=9, n3=3, n4=5, n5=3, n6=9, and n7=6, desirable images which are free from discontinuity and significant distortions are attainable. The division ratio N was 69 at opposite ends of the scanning range and 89 at the center. Scattering among the pixels was less than 2%.

In summary, it will be seen that the present invention provides a new and useful scanning clock generating device for an optical scanner which allows the scanner to accomplish optical scanning without resorting an expensive F-theta lens.

Various modifications will become possible for those skilled in the art after receiving the teachings of the present disclosure without departing from the scope thereof.

What is claimed is:

1. In an optical scanner of a type scanning a desired surface by a deflected light beam and without using an F-theta lens, a scanning clock generating device for generating an image scanning clock the frequency of which is continuously variable, comprising:
   an oscillator for oscillating a reference clock;
   a first frequency divider for dividing a frequency of the reference clock to produce a position control clock;
   an up-down counter for stepwisely varying a division ratio N which is assigned to said first frequency divider;
   a controller for, in the event of scanning a scanning range which is divided into K blocks BLi (i=1 to K), driving based on a predetermined finite series Mi (i=1, 2, ..., K) said up-down counter responsive to every Mi pulses of the position control clock in an "i" block BLi (i=1 to K), thereby stepwise switching over the division ratio N; and a phase locked loop for generating a scanning clock a frequency of which continuously varies responsive to the stepwise variation of the frequency of the position control clock.

2. A scanning clock generating device as claimed in claim 1, wherein said phase locked loop comprises a phase detector, a low-pass filter, a voltage-controlled oscillator, and a second frequency divider having a division ratio M.

* * * * *